United States Patent [19]
Yoshimura et al.

[11] Patent Number: 4,739,166
[45] Date of Patent: Apr. 19, 1988

[54] RADIATION IMAGE RECORDING AND READ-OUT APPARATUS

[75] Inventors: Ryoichi Yoshimura; Shumpeita Torii, both of Kanagawa, Japan

[73] Assignee: Fuji Photo Film Co., Ltd., Kanagawa, Japan

[21] Appl. No.: 941,119

[22] Filed: Dec. 12, 1986

[30] Foreign Application Priority Data

Dec. 12, 1985 [JP] Japan ................................. 60-279839

[51] Int. Cl.$^4$ .......................... G01T 1/10; G01T 1/105
[52] U.S. Cl. ................................ 250/327.2; 250/484.1
[58] Field of Search ......................... 250/327.2, 484.1; 378/173, 172

[56] References Cited

U.S. PATENT DOCUMENTS

| | | | |
|---|---|---|---|
| 3,415,988 | 12/1968 | Gidlund | 378/173 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |
| 4,578,582 | 3/1986 | Takano | 250/327.2 |

Primary Examiner—Janice A. Howell
Assistant Examiner—Constantine Hannaher
Attorney, Agent, or Firm—Sughrue, Mion, Zinn, Macpeak & Seas

[57] ABSTRACT

An apparatus for recording a radiation image on a stimulable phosphor sheet and reading out the stored radiation image comprises a recording section provided with a sheet stacker, a read-out section, and an erasing section disposed on a circulation path of a conveyance system. The sheet stacker is provided with a tray unit comprising a casing and a plurality of trays housed in the casing so that every tray may be positioned on the circulation path, allows the stimulable phosphor sheet to be conveyed by the conveyance system into the tray, holds the stimulable phosphor sheet in the tray, and allows the stimulable phosphor sheet to be conveyed by the conveyance system out of the tray. The sheet stacker is also provided with a conveyance mechanism for taking the stimulable phosphor sheet out of an arbitrary tray housed in the casing, conveying the stimulable phosphor sheet to an image recording position exposed to a radiation, and conveying the stimulable phosphor sheet from the image recording position into an arbitrary tray.

7 Claims, 4 Drawing Sheets

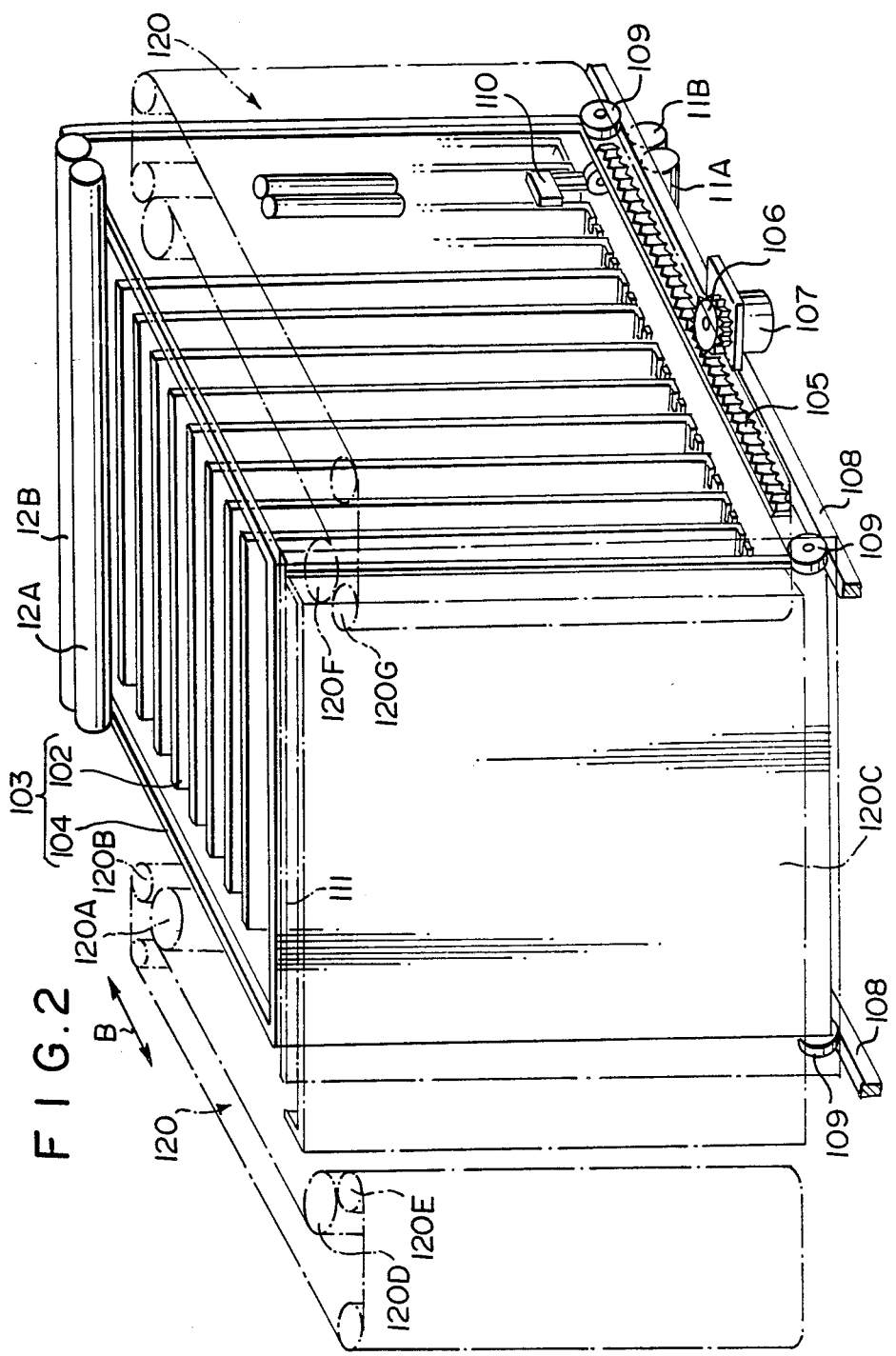

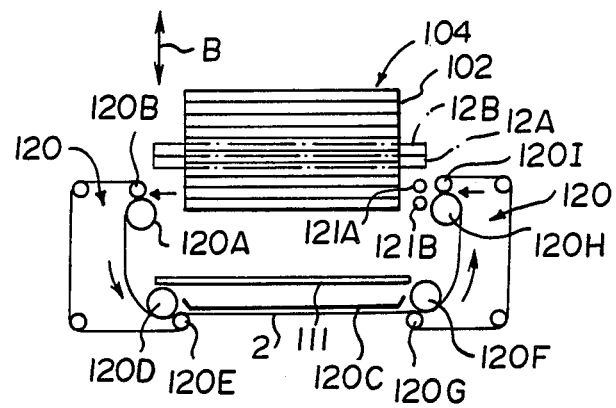
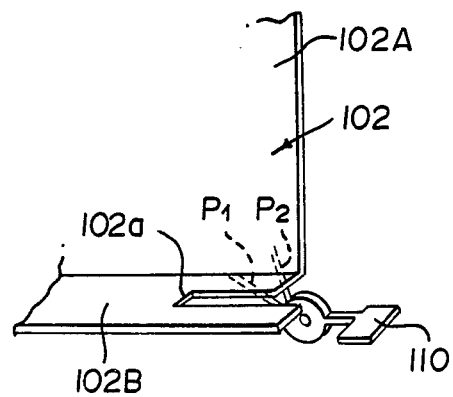
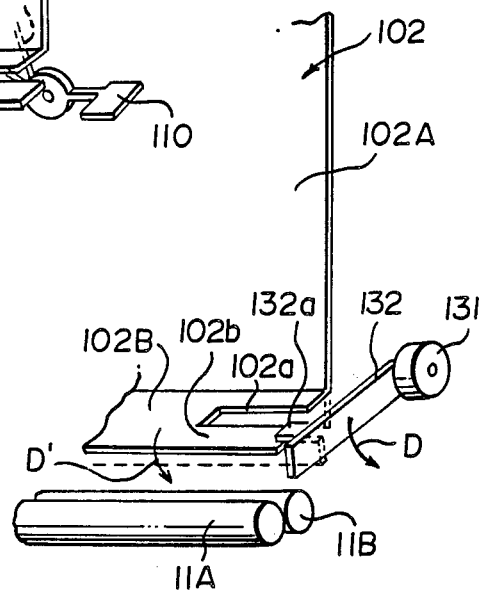

RADIATION IMAGE RECORDING AND READ-OUT APPARATUS

BACKGROUND OF THE INVENTION

1. Field of the Invention

This invention relates to a radiation image recording and read-out apparatus for exposing stimulable phosphor sheets to a radiation passing through an object to have a radiation image of the object stored thereon, exposing the respective stimulable phosphor sheets to stimulating rays which cause them to emit light in proportion to the stored radiation energy, and detecting and converting the emitted light into electric signals. This invention particularly relates to a radiation image recording and read-out apparatus wherein the stimulable phosphor sheets are circulated by a circulation and conveyance means along a predetermined circulation path and reused for radiation image recording.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor (hereinafter referred to as a stimulable phosphor sheet or simply as a sheet) is first exposed to a radiation passing through an object to have a radiation image stored thereon, and is then scanned with stimulating rays which cause it to emit light in proportion to the radiation energy stored. The light emitted by the stimulable phosphor sheet when the sheet is exposed to the stimulating rays is photoelectrically detected and converted into an electric image signal, which is processed as desired to reproduce a visible image having an improved image quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, temporarily store the radiation images of the objects on the stimulable phosphor sheets, transfer the electric image signals read out from the stimulable phosphor sheets to a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining on the stimulable phosphor sheet after it is scanned with stimulating rays to read out the radiation image stored thereon should be erased by using a method as described, for example, in U.S. Pat. No. 4,400,619 or Japanese Unexamined Patent Publication No. 56(1981)-12599. The stimulable phosphor sheet may then be used again for radiation image recording.

From the aforesaid viewpoint, the applicant proposed in Japanese Unexamined Patent Publication No. 59(1984)-192240 a built-in type radiation image recording and read-out apparatus comprising:

(i) a circulation and conveyance means for conveying at least one stimulable phosphor sheet for recording a radiation image thereon along a predetermined circulation path, (ii) an image recording section positioned on said circulation path for recording a radiation image of an object on said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned with said stimulating rays to obtain an electric image signal, and (iv) an erasing section positioned on said circulation path for, prior to the next image recording on said stimulable phosphor sheet for which the image read-out has been conducted at said image read-out section, having said stimulable phosphor sheet release the radiation energy remaining on said stimulable phosphor sheet, whereby said stimulable phosphor sheet is circulated through said image recording section, said image read-out section and said erasing section and reused for radiation image recording.

Since the built-in type radiation image recording and read-out apparatus is one that can be very conveniently used for, for example, mounting on a mobile X-ray diagnostic station as mentioned above, it is desirable that the apparatus can conduct continuous image recording and read-out operations at as short intervals as possible and is small.

On the other hand, in the aforesaid built-in type radiation image recording and read-out apparatus, stimulable phosphor sheets are circulated through the image recording, image read-out and erasing steps. When image recording is conducted continuously as mentioned above, it is necessary that a plurality of stimulable phosphor sheets readied for image recording by erasing be fed continuously to the image recording section. However, the time required for the image read-out step and the time required for the erasing step are longer than the time required for the image recording step, among which the time required for the image read-out step is the longest (for example, approximately 45 seconds). Therefore, in the case where image recording is conducted each time the stimulable phosphor sheet on which image read-out and erasing are finished is returned to the image recording section, a problem that arises is that the image recording interval becomes long. Accordingly, when image recording is conducted continuously, it is necessary to provide the circulation path between the erasing section and the image recording section with a waiting zone for keeping waiting a plurality of erased stimulable phosphor sheets, from which the sheets may be taken out one by one. On the other hand, though the stimulable phosphor sheets subjected to image recording must be sequentially sent to the image read-out section for conducting image read-out therefrom, the image read-out time is very much longer than the image recording time, and the second and subsequent sheets on which image recording is finished cannot immediately be conveyed to the image read-out section. Therefore, it is also necessary to provide the circulation path between the image recording section and the image read-out section with a waiting zone for keeping waiting a plurality of stimulable phosphor sheets carrying a radiation image stored thereon, from which the sheets may be taken out one by one each time the image readout section is readied for the read-out operation. The waiting zone is proposed in, for example, Japanese Patent Application Nos. 59(1984)-112377 and 59(1984)-112378. Consequently, in order to conduct image recording continuously with the built-in type radiation image recording and read-out apparatus, it is necessary to dispose two waiting zones, one prior to the image recording section and the other after the image recording section. Thus the apparatus becomes large, its configuration becomes complicated, and its manufacturing cost becomes high.

SUMMARY OF THE INVENTION

The primary object of the present invention is to provide a built-in type radiation image recording and read-out apparatus provided with a configuration which makes continuous image recording possible without increasing the apparatus size and making the mechanism complicated.

Another object of the present invention is to provide a built-in type radiation image recording and read-out apparatus which efficiently conducts continuous image recording.

The present invention provides a radiation image recording and read-out apparatus comprising:

(i) a circulation and conveyance means for conveying stimulable phosphor sheets along a predetermined circulation path, (ii) an image recording section disposed on said circulation path for recording a radiation image on each of said stimulable phosphor sheets by exposing said stimulable phosphor sheet to a radiation carrying image information, (iii) an image read-out section disposed on said circulation path and provided with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned by said stimulating rays to obtain an electric image signal, and (iv) an erasing section disposed on said circulation path for, prior to the next image recording on said stimulable phosphor sheet for which the image read-out has been conducted at said image read-out section, having said stimulable phosphor sheet release the radiation energy remaining on said stimulable phosphor sheet, wherein said image recording section is provided with a sheet stacker constituted by: a) a tray unit comprising a casing and a plurality of trays housed in said casing so that each of said trays may be positioned on said circulation path, allows said stimulable phosphor sheet to be conveyed by said circulation and conveyance means into said tray, holds said stimulable phosphor sheet in said tray, and allows said stimulable phosphor sheet to be conveyed by said circulation and conveyance means out of said tray, and b) a conveyance mechanism for taking said stimulable phosphor sheet out of an arbitrary one of said trays housed in said casing, conveying said stimulable phosphor sheet to an image recording position exposed to said radiation, and conveying said stimulable phosphor sheet from said image recording position into an arbitrary tray.

With the radiation image recording and read-out apparatus in accordance with the present invention, it is possible to conduct ordinary circulation and conveyance of the stimulable phosphor sheet by the circulation and conveyance means by positioning an arbitrary one of the trays, which are housed in the casing at the image recording section, on the circulation path. Also, it is possible to utilize some of the trays in the casing as a waiting zone for keeping waiting the erased stimulable phosphor sheets, and to take the stimulable phosphor sheet out of an arbitrary tray housing the erased stimulable phosphor sheet and send said stimulable phosphor sheet to the image recording position for conducting the image recording. It is also possible to utilize empty ones among the trays housed in the casing as a waiting zone for keeping waiting the stimulable phosphor sheets carrying a radiation image stored thereon before they are conveyed to the image read-out section, and to sequentially convey the stimulable phosphor sheets, on which image recording is finished, into the empty trays. Therefore, with the radiation image recording and read-out apparatus of the present invention provided with the sheet stacker disposed at the image recording section, it becomes possible to omit waiting zones which were necessary respectively before and after the image recording section in the conventional configuration, and to conduct continuous image recording efficiently without causing the apparatus size to become large.

Also, when the stimulable phosphor sheets having different sizes are housed in the tray unit, it becomes possible to selectively use the stimulable phosphor sheet of an arbitrary size suitable for the size of the object subjected to image recording. Further, it is possible to conduct image read-out for the stimulable phosphor sheets in an arbitrary priority order.

BRIEF DESCRIPTION OF THE DRAWINGS

FIG. 2 is a perspective view showing the image recording section in the embodiment of FIG. 1, FIG. 3 is a plan view showing the image recording section of FIG. 2, FIG. 4 is a perspective view showing the tray and the sheet pushing-out plate at the image recording section of FIG. 2, FIG. 5 is a perspective view showing the tray and the sheet unloading mechanism at the image recording section of FIG. 2.

DESCRIPTION OF THE PREFERRED EMBODIMENTS

The present invention will hereinbelow be described in further detail with reference to the accompanying drawings.

Figure 1:
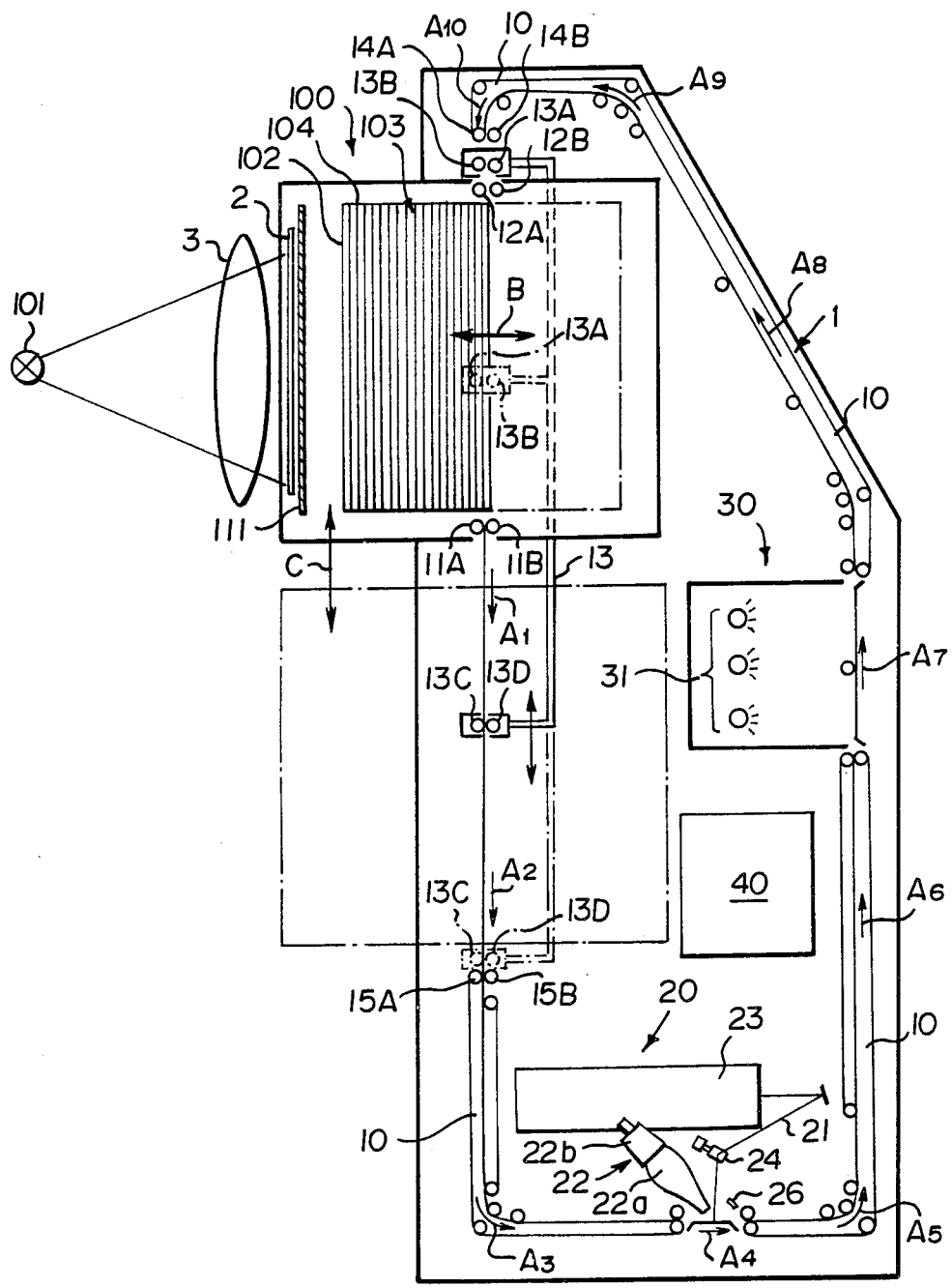
FIG. 1 is a schematic side view showing an embodiment of the radiation image recording and read-out apparatus in accordance with the present invention.

Referring to FIG. 1, an embodiment of the radiation image recording and read-out apparatus in accordance with the present invention is provided with a circulation path 1. A stimulable phosphor sheet (hereinafter simply referred to as the sheet) 2 is conveyed and circulated along the circulation path 1 by a circulation and conveyance means 10 comprising endless belts, rollers, guide plates or the like.

An image recording section 100 for recording a radiation image on the sheet 2, an image read-out section 20 for reading out the radiation image stored on the sheet 2, and an erasing section 30 for erasing radiation energy remaining on the sheet 2 after the image read-out are sequentially disposed on the circulation path 1 in the conveyance direction of the sheet 2. In the apparatus, a plurality of the sheets 2, 2, . . . are conveyed and circulated sequentially through the image recording section 100, the image read-out section 20 and the erasing section 30 by the circulation and conveyance means 10.

At the image recording section 100, the sheet 2 is exposed to a radiation emitted by a radiation source 101 and passing through an object 3 to have a radiation image of the object 3 stored on the sheet 2. The image recording section 100 is provided with a tray unit 103 moveable in the direction as indicated by the arrow B and comprising a casing 104 and a plurality of trays 102, 102, . . . each housing a single sheet 2, which are housed in the casing 104. One of the sheets 2, 2, . . . readied for image recording and housed in the trays 102, 102, . . . is taken out of the tray 102 by a conveyance mechanism as will be described later and conveyed to the image recording position shown. After image recording on the sheet 2, the sheet 2 is conveyed by the conveyance mechanism into an empty tray 102. When the sheet 2 on which image recording is finished is to be unloaded from the image recording section 100, the tray unit 103 is moved in the direction as indicated by the arrow B so that the tray 102 holding said sheet 2 is positioned above unloading rollers 11A and 11B provided at the lower end of the image recording section 100. The lower end of the tray 102 positioned above the unloading rollers 11A and 11B is then opened to allow the sheet 2 to fall under its weight and transfer the sheet 2 to the unloading rollers 11A and 11B. The sheet 2 is then conveyed by the circulation and conveyance means in the directions as indicated by the arrows A1, A2 and A3 to the image read-out section 20. The number of the sheets 2, 2, . . . which can be conveyed and circulated through the image recording section 100, the image read-out section 20 and the erasing section 30 in the apparatus is equal to the number of the trays 102, 102, . . . at the image recording section 100.

At the image read-out section 20, the sheet 2 carrying a radiation image stored thereon is scanned with stimulating rays 21 such as a laser beam which cause the sheet 2 to emit light in proportion to the stored radiation energy, and the emitted light is photoelectrically detected by a photoelectric read-out means 22 constituted by a photomultiplier or the like to obtain an electric image signal for use in reproduction of a visible image. Reference numeral 23 denotes a stimulating ray source, and reference numeral 24 denotes a light deflector such as a galvanometer mirror. Reference numeral 26 designates a reflection mirror for reflecting the light emitted by the sheet 2 towards a light guide member 22a of the photoelectric read-out means 22. The light guide member 22a guides the light through total reflection therein up to a photodetector 22b constituted by a photomultiplier or the like.

The sheet 2 sent to the image read-out section 20 is conveyed by the circulation and conveyance means 10 in the direction as indicated by the arrow A4, and the whole surface of the sheet 2 is scanned two-dimensionally by the stimulating rays 21 deflected approximately normal to the conveyance direction. The light emitted by the sheet 2 during the scanning is detected by the photodetector 22b via the light guide member 22a. Image read-out is conducted in this manner. The electric image signal thus obtained is sent to an image processing circuit (not shown) and subjected therein to the necessary image processing. The electric image signal thus processed is then sent to an image reproducing apparatus (not shown). The image reproducing apparatus may be a display device such as a cathode ray tube (CRT), or may be a photographic reproducing apparatus for reproducing a visible image on a photographic film by point-by-point scanning, or may be a memory device using e.g. a magnetic tape for memorizing the electric image signal for later use in image reproduction. Also, the optical members disposed at the image read-out section 20 are not limited to those described above. For example, as disclosed in Japanese Patent Application No. 60(1985)-156255, a long photomultiplier may be disposed as the photoelectric read-out means along the main scanning line, and the light emitted by the sheet 2 may be detected without using the light guide member 22a.

After image read-out from the sheet 2 is finished at the image read-out section 20, the sheet 2 is conveyed by the circulation and conveyance means 10 in the directions as indicated by the arrows A5 and A6 to the erasing section 30.

At the erasing section 30, radiation energy remaining on the sheet 2 after the image read-out is finished is erased. Specifically, a part of the radiation energy stored on the sheet 2 at the image recording step remains stored thereon after the image read-out. In order to reuse the sheet 2, the residual radiation energy is erased at the erasing section 30. For this purpose, any erasing method may be used. In this embodiment, the erasing section 30 is provided with a plurality of erasing light sources 31, 31, . . . constituted by fluorescent lamps, tungsten-filament lamps, sodium lamps, xenon lamps, iodine lamps or the like and the sheet 2 is exposed to the erasing light emitted by the erasing light sources 31, 31, . . . for releasing the residual radiation energy from the sheet 2 while the sheet 2 is conveyed in the direction as indicated by the arrow A7.

After erasing of the sheet 2 is finished at the erasing section 30, the sheet 2 is conveyed by the circulation and conveyance means 10 in the directions as indicated by the arrows A8, A9 and A10 to the image recording section 100. Before the erased sheet 2 is conveyed into an empty tray 102, the tray unit 103 at the image recording section 100 is moved in the direction as indicated by the arrow B so that the empty tray 102 for receiving the sheet 2 is positioned below a pair of feed rollers 12A and 12B disposed at the upper end of the image recording section 100. The sheet 2 conveyed into the tray 102 is then taken out of the tray 102 when required for use in image recording.

Since this embodiment is provided with the image recording section 100 at which a plurality of the sheets 2, 2, . . . are housed in the form held in the trays 102, 102, . . . , it is possible to conduct continuous image recording efficiently without causing the apparatus size to become large. The configuration and operations of the image recording section 100 will now be described with reference to FIGS. 2 to 6.

As shown in FIG. 2, a plurality of the trays 102, 102, . . . are housed in the casing 104 in the upright form in parallel with one another. The trays 102, 102, . . . and the casing 104 constitute the tray unit 103 and are moveable integrally in the direction as indicated by the arrow B. As shown in FIG. 4, each of the trays 102, 102, . . . comprises a supporting plate 102A, and a rotatable bottom plate 102B approximately normal to the supporting plate 102A. Reverting to FIG. 2, the upper face, the lower face, the right side face and the left side face of the casing 104 are opened with only the framework remaining for allowing feeding and unloading of the sheet 2 from the casing 104. For moving the tray unit 103 in the direction as indicated by the arrow B, a rack 105 provided at the lower end of one side face of the casing 104 is engaged with a pinion 106, the pinion 106 is rotated by a motor 107, and wheels 109, 109, . . . secured to the lower end of casing 104 are moved along rails 108, 108. The position of the tray unit 103 shown in FIG. 1 is the left end position of the movement of the tray unit 103. The tray unit 103 is moveable up to the position as indicated by the chain line in FIG. 1. In this embodiment, the rack 105, the pinion 106, the motor 107, the rails 108, 108, and the wheels 109, 109, . . . constitute the movement means for the casing 104.

On the other hand, as shown in FIGS. 2 and 3, a conveyance mechanism 120 is provided on the lateral side of the tray unit 103. The conveyance mechanism 120 takes the sheet 2 out of one side end of the tray 102 disposed at a first predetermined position adjacent to rollers 120A and 120B, conveys the sheet 2 to the image recording position, and then conveys it from the image recording position into the tray 102 via the other side end thereof disposed at a second predetermined position adjacent to rollers 120H and 120I. Though the first predetermined position at which the sheet 2 is taken out of the tray 102 may be different from the second predetermined position at which the sheet 2 is inserted into the tray 102, they are made to coincide with each other in this embodiment. Also, the aforesaid movement means moves the tray unit 103 so that an arbitrary tray 102 in the tray unit 103 may be associated with the feed rollers 12A and 12B, and the unloading rollers 11A and 11B, and disposed at the aforesaid predetermined position. The width of each tray 102 is slightly smaller than the width of the sheet 2.

Before continuous image recording is started in this embodiment, as many sheets 2, 2, . . . as possible readied for image recording are maintained in the tray unit 103, for example, by finishing image read-out and erasing for all the sheets 2, 2, . . . used in the apparatus. When image recording is conducted, the tray unit 103 is moved by the aforesaid movement means so that the tray 102 housing a sheet 2 which is to be used comes to the predetermined position. As shown in FIG. 4, a cutaway portion 102a is formed in the bottom plate 102B of each tray 102 at said other side end thereof, and a sheet pushing-out plate 110 is provided in the vicinity of the cutaway portion 102a of the tray 102 disposed at the predetermined position at the image recording section 100. Normally, the sheet pushing-out plate 110 is maintained at a position retracted downwardly from the tray 102 as indicated by the solid line in FIG. 4. When the selected tray 102 arrives at the predetermined position and the sheet 2 is to be taken out of the tray 102, the sheet pushing-out plate 110 is rotated by a movement means (not shown) constituted by a motor or the like through the cutaway portion 102a of the tray 102 up to a position P1, and pushes one side edge of the tray 102 to have the other side edge of the tray 102 gripped between the rollers 120A and 120B of the conveyance mechanism 120. The tray 102 gripped between the rollers 120A and 120B is conveyed in the direction as indicated by the arrow in FIG. 3, and positioned on a supporting plate 120C provided on the front side. At this position, the sheet 2 is subjected to image recording. At this image recording position, the leading end and the rear end of the sheet 2 as viewed in the conveyance direction are nipped between rollers 120D and 120E, and between rollers 120F and 120G. Also, a shielding plate 111 formed of lead or the like is provided between the tray unit 103 and the supporting plate 120C so that the other sheets 2, 2, . . . housed in the tray unit 103 are not adversely affected by a radiation emitted to the sheet 2 at the image recording position for image recording. When the image recording on the sheet 2 is finished, the sheet 2 is conveyed by the conveyance mechanism 120 in the direction as indicated by the arrow, and conveyed by the rollers 120H and 120I into the empty tray 102 in the tray unit 103. The empty tray 102 may be the same tray 102 from which the sheet 2 subjected to the image recording was taken out, or may be a different empty tray. In the case where a sheet 2 for the next image recording has been taken out of a different tray 102 before the aforesaid sheet 2 used first for the image recording is returned to the tray unit 103, the sheet 2 used first for the image recording may be conveyed into said different tray 102 which is now empty. In any case, the position of the tray unit 103 is adjusted so that a desired empty tray 102 is disposed at the predetermined position before the sheet 2 on which the image recording is finished is returned to the tray unit 103.

The rollers 120H and 120I convey the sheet 2 carrying a radiation image stored thereon up to a position midway of the tray 102. As shown in FIG. 3, in order to reliably insert the sheet 2 into the tray 102, a pair of feed rollers 121A and 121B are provided above the sheet pushing-out plate 110. The feed rollers 121A and 121B receive the sheet 2 conveyed by the rollers 120H and 120I, and insert the sheet 2 close to the predetermined housing position in the tray 102. Then, as shown in FIG. 4, the sheet pushing-out plate 110 is rotated to a position P2, pushes the rear edge of the sheet 2 as viewed in the conveyance direction, and separates the sheet 2 from the feed rollers 121A and 121B.

With the image recording section 100 having the aforesaid configuration, it is possible to move the tray unit 103 by the movement means to dispose the tray 102 housing the sheet 2 readied for image recording and the empty tray 102 for housing the sheet 2, on which image recording is finished, alternately at the predetermined position, thereby conducting continuous image recording efficiently with a compact mechanism. Specifically, when the erased sheets 2, 2, ... are collected in the trays 102, 102, ... before the image recording is started, it is possible to send the erased sheets 2, 2, ... sequentially from the trays 102, 102, ... to the image recording zone, and to conduct the image recording continuously on a plurality of the sheets 2, 2, ... without providing a stack zone between the image recording section 100 and the erasing section 30. Also, since the sheets 2, 2, ... on which the image recording is finished may be returned sequentially into the trays 102, 102, ... and made to wait therein, it is possible to send the sheet 2 carrying a radiation image stored thereon at an arbitrary timing from the tray 102 to the image read-out section 20, and to omit a stack zone between the image read-out section 20 and the image recording section 100. Conveyance of the sheet 2 subjected to the image recording to the image read-out section 20 is conducted each time image read-out from the previously sent sheet 2 is finished at the image read-out section 20. Before the conveyance, the tray unit 103 is moved by the movement means, and the tray 102 housing the sheet 2 which is to be conveyed to the image read-out section 20 is positioned above the unloading rollers 11A and 11B provided at the lower end of the image recording section 100. As shown in FIG. 5, a lever 132 provided with a protrusion 132a and rotated by a drive means 131 constituted by a rotary solenoid or the like in the direction as indicated by the arrow D is disposed on the lateral side of the tray 102 at the unloading position. The protrusion 132a is engaged with a protrusion 102b defining the cutaway portion 102a of the bottom plate 102B of the tray 102, and rotates the bottom plate 102B in the direction as indicated by the arrow D' as the lever 132 is rotated in the direction as indicated by the arrow D. The bottom plate 102B is thus moved to a plane as indicated by the broken line in FIG. 5 approximately flush with the supporting plate 102A of the tray 102. When the bottom plate 102B is rotated to said position, the sheet 2 falls under its weight from the tray 102. The unloading rollers 11A and 11B grip the leading end of the falling sheet 2, and convey the sheet 2 out of the image recording section 100. When the unloading of the sheet 2 from the image recording section 100 is finished, the lever 132 is returned to the position shown in FIG. 5, and the bottom plate 102B is returned to the position indicated by the solid line.

The sheet 2 unloaded from the image recording section 100 is subjected to the image read-out at the image read-out section 20 and the erasing at the erasing section 30, and then returned to the image recording section 100. In order to smoothly conduct the sheet conveyance to and from the image recording section 100, and the sheet feeding and unloading from the tray 102 at the image recording section 100, it is necessary to provide a control means for controlling the sheet conveyance timing of the two systems, memorizing whether the respective trays 102, 102, ... in the tray unit 103 house sheets 2, 2, ... which are erased or carrying a radiation image stored thereon, or are empty, and moving a desired tray 102 to the necessary position. For this purpose, this embodiment is provided with a control section 40 above the image read-out section 20.

Figure 6:
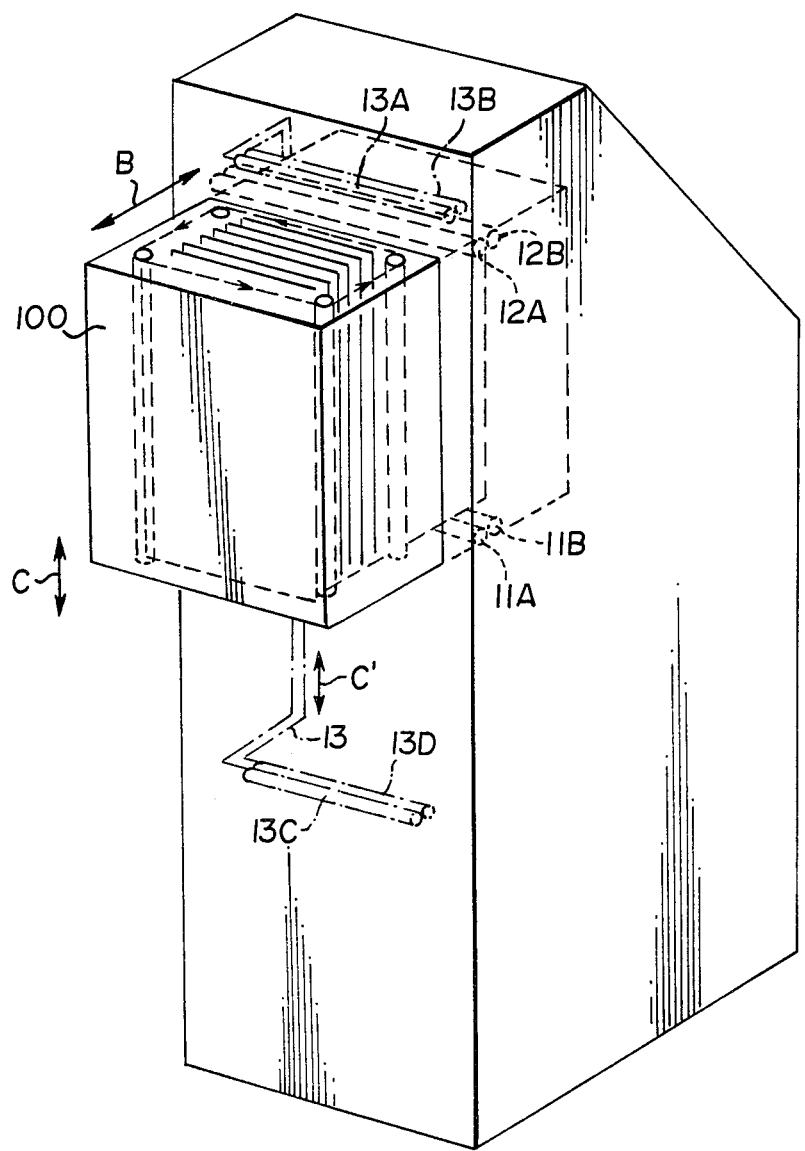
FIG. 6 is a schematic perspective view showing vertical movement of the image recording section and a part of the circulation and conveyance means in the embodiment of FIG. 1.

Also, in this embodiment, the image recording section 100 is moveable in the direction as indicated by the arrow C between the position indicated by the solid line in FIG. 1 and the position indicated by the chain line so that the image recording position may be changed vertically. As shown in FIGS. 1 and 6, a pair of conveying rollers 13A and 13B and a pair of conveying rollers 13C and 13D constituting a part of the circulation and conveyance means 10 are moved by being supported on a supporting shaft 13 in a manner interlocked with the movement of the image recording section 100. Specifically, as shown in FIG. 6, the supporting shaft 13 is disposed so that it does not intersect the movement space of the image recording section 100, and is moved in the direction as indicated by the arrow C'. The supporting shaft 13 is moved by adjusting the roller spacings so that the spaces from the conveying rollers 13A and 13B to the adjacent conveying rollers 14A and 14B and to the feed rollers 12A and 12B are respectively smaller than the length of the sheet 2, and the spaces from the conveying rollers 13C and 13D to the adjacent conveying rollers 15A and 15B and to the unloading rollers 11A and 11B are respectively smaller than the length of the sheet 2, wherever the image recording section 100 is positioned within its movement range. For example, when the image recording section 100 is disposed at the position indicated by the chain line in FIG. 1, the supporting shaft 13 and the conveying rollers 13A, 13B, 13C and 13D are disposed at the positions indicated by the chain line. When the image recording section 100 is thus constituted for vertical movement, it is possible to quickly cope with changes in height of the object or changes in the image recording portion of the object, or the like.

The trays in the tray unit may also be disposed in an inclined form or horizontally. In this case, sheet feeding and unloading from the trays may be conducted by using a conveyance mechanism and a movement means adapted to the tray holding means. Also, the configurations of the movement means for the tray unit and the conveyance mechanism at the image recording section are not limited to those in the aforesaid embodiment. For example, instead of disposing the means for conveying the sheet from the tray to the image recording position and the means for conveying the sheet from the image recording position to the tray on opposite sides of the tray unit, a single common means may be disposed on one side of the tray unit.

It is also possible to make the conveyance mechanism moveable with respect to the tray unit for conveying the sheet from an arbitrary tray to the image recording position and conveying the sheet from the image recording position into an arbitrary empty tray.

We claim:

1. A radiation image recording and read-out apparatus comprising:
   (i) a circulation and conveyance means for conveying stimulable phosphor sheets along a predetermined circulation path,
   (ii) an image recording section disposed on said circulation path for recording a radiation image on each of said stimulable phosphor sheets by exposing said stimulable phosphor sheet to a radiation carrying image information, (iii) an image read-out section disposed on said circulation path and provided with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned by said stimulating rays to obtain an electric image signal, and (iv) an erasing section disposed on said circulation path for, prior to the next image recording on said stimulable phosphor sheet for which the image read-out has been conducted at said image read-out section, having said stimulable phosphor sheet release the radiation energy remaining on said stimulable phosphor sheet, wherein said image recording section is provided with a sheet stacker constituted by:

(a) a tray unit comprising a casing and a plurality of trays housed in said casing so that each of said trays may be positioned on said circulation path, allows said stimulable phosphor sheet to be conveyed by said circulation and conveyance means into said tray, holds said stimulable phosphor sheet in said tray, and allows said stimulable phosphor sheet to be conveyed by said circulation and conveyance means out of said tray, and (b) a conveyance mechanism for taking said stimulable phosphor sheet out of an arbitrary one of said trays housed in said casing, conveying said stimulable phosphor sheet to an image recording position exposed to said radiation, and conveying said stimulable phosphor sheet from said image recording position into an arbitrary tray.

2. An apparatus as defined in claim 1 wherein said casing of said sheet stacker is moveable so that said arbitrary tray in said tray unit may be positioned on said circulation path, and said conveyance mechanism is moveable with respect to said tray unit.

3. An apparatus as defined in claim 1 wherein each of said trays comprises a supporting plate, and a bottom plate approximately normal to said supporting plate and provided with a cutaway portion at a side end for allowing movement of a sheet pushing-out plate into said cutaway portion for pushing said stimulable phosphor sheet out of and into said tray.

4. An apparatus as defined in claim 3 wherein said bottom plate is moveable between a first position for receiving the lower end of said stimulable phosphor sheet and holding said stimulable phosphor sheet in said tray and a second position rotated downward from said first position to allow the sheet to fall under its weight and discharge it out of said tray unit.

5. An apparatus as defined in claim 1 wherein a radiation shielding plate is disposed between said tray unit and said image recording position.

6. An apparatus as defined in claim 1 wherein said image recording section is moveable together with said sheet stacker to shift said image recording position.

7. An apparatus as defined in claim 6 wherein a part of said circulation and conveyance means adjacent to said sheet stacker is moveable in synchronization with the movement of said image recording section for sheet feeding and unloading from said sheet stacker at every position of said image recording section.

* * * * *